US012013945B1

(12) United States Patent
Mudge et al.

(10) Patent No.: US 12,013,945 B1
(45) Date of Patent: Jun. 18, 2024

(54) FRAUDULENT OVERLAY DETECTION IN ELECTRONIC DOCUMENTS

(71) Applicant: MORGAN STANLEY SERVICES GROUP INC., New York, NY (US)

(72) Inventors: Eric Mudge, Woodstock, MD (US); Joseph Edmonds, Ellicott City, MD (US); Russell Moriarty, Ellicott City, MD (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 18/384,822

(22) Filed: Oct. 27, 2023

(51) Int. Cl.
*G06F 21/56* (2013.01)
*G06Q 20/40* (2012.01)
*G06Q 30/018* (2023.01)
*G06Q 40/02* (2023.01)
*G06V 10/94* (2022.01)
*G06V 30/14* (2022.01)
*G06V 30/19* (2022.01)
*G06V 30/413* (2022.01)

(52) U.S. Cl.
CPC ....... *G06F 21/566* (2013.01); *G06Q 20/4016* (2013.01); *G06Q 30/0185* (2013.01); *G06Q 40/02* (2013.01); *G06V 10/95* (2022.01); *G06V 30/1448* (2022.01); *G06V 30/19093* (2022.01); *G06V 30/19147* (2022.01); *G06V 30/19173* (2022.01); *G06V 30/413* (2022.01); *G06F 2221/033* (2013.01)

(58) Field of Classification Search
CPC .............. G06F 21/566; G06V 30/413; G06V 30/19147; G06Q 20/4016

USPC .......................................................... 726/22
See application file for complete search history.

(56) References Cited

U.S. PATENT DOCUMENTS

| | | | | |
|---|---|---|---|---|
| 6,687,017 | B1* | 2/2004 | Kakiuchi | H04N 1/00843 358/1.14 |
| 9,785,627 | B2* | 10/2017 | Campanelli | G06V 30/418 |
| 9,847,973 | B1 | 12/2017 | Jakobsson et al. | |
| 10,380,559 | B1 | 8/2019 | Oakes, III et al. | |
| 11,102,244 | B1 | 8/2021 | Jakobsson et al. | |
| 11,699,066 | B2* | 7/2023 | Gonzalez Aguirre | G06N 3/045 367/87 |
| 11,853,374 | B2* | 12/2023 | Chandra | G06F 16/9538 |

(Continued)

OTHER PUBLICATIONS

Pablo Castells; An Adaptation of the Vector-Space Model for Ontology-Based Information Retrieval; IEEE:2005; pp. 261-272.*

*Primary Examiner* — Monjur Rahim
(74) *Attorney, Agent, or Firm* — Weitzman Law Offices, LLC (57) ABSTRACT

A computer-implemented method of analyzing the contents of a file in a visual document format to identify a potentially-fraudulent overlay is disclosed. The method includes receiving the file, iterating over a set of visually rendered elements within the file, and calculating, for each element in the set, a bounding box. Based on identifying a pair of elements having at least partially overlapping bounding boxes, such that a visible item in an overlaid element at least partially obscures an item in an underlying element that would otherwise be visible, an attack vector ontology is updated to include information on the overlaid and underlying element. This attack vector ontology may be used in training an automatic system to identify fraudulent documents and prevent their being printed, signed, and/or further used.

20 Claims, 7 Drawing Sheets

(56) References Cited

U.S. PATENT DOCUMENTS

| | | | |
|---|---|---|---|
| 2008/0082521 A1* | 4/2008 | Danielson | G06F 16/34 |
| | | | 707/999.005 |
| 2008/0178288 A1* | 7/2008 | Alperovitch | H04L 51/212 |
| | | | 726/22 |
| 2008/0273769 A1* | 11/2008 | Lo | G06V 40/1365 |
| | | | 382/125 |
| 2011/0238510 A1* | 9/2011 | Rowen | G06V 40/382 |
| | | | 705/16 |
| 2012/0084644 A1* | 4/2012 | Robert | G06F 16/168 |
| | | | 715/255 |
| 2012/0311703 A1 | 12/2012 | Yanovsky et al. | |
| 2013/0085815 A1* | 4/2013 | Onischuk | G07C 13/00 |
| | | | 235/386 |
| 2014/0231512 A1* | 8/2014 | Onischuk | G07C 13/00 |
| | | | 235/386 |
| 2014/0365281 A1* | 12/2014 | Onischuk | G07C 13/00 |
| | | | 705/12 |
| 2015/0012339 A1* | 1/2015 | Onischuk | G07C 13/00 |
| | | | 235/386 |
| 2016/0049010 A1* | 2/2016 | Hinski | H04N 23/80 |
| | | | 345/633 |
| 2018/0295153 A1 | 10/2018 | Eisen | |
| 2018/0350180 A1* | 12/2018 | Onischuk | G07C 13/00 |
| 2019/0325642 A1* | 10/2019 | Martinet | G06F 16/9024 |
| 2019/0354682 A1 | 11/2019 | Finkelshtein et al. | |
| 2020/0042837 A1* | 2/2020 | Skinner | G06F 18/217 |
| 2020/0067861 A1* | 2/2020 | Leddy | G06F 21/6245 |
| 2020/0265530 A1* | 8/2020 | Lee | H04L 9/3297 |
| 2020/0406664 A1* | 12/2020 | Munoz Utiel | G07D 7/2016 |
| 2021/0044558 A1 | 2/2021 | Eisen et al. | |
| 2021/0124919 A1* | 4/2021 | Balakrishnan | B42D 25/309 |
| 2022/0014543 A1 | 1/2022 | Jakobsson et al. | |
| 2022/0156756 A1 | 5/2022 | Eapen et al. | |
| 2022/0279015 A1 | 9/2022 | Sambamoorthy et al. | |
| 2022/0309516 A1* | 9/2022 | Rhoads | G06N 20/00 |
| 2022/0392047 A1* | 12/2022 | Wheaton | G06V 10/40 |
| 2022/0414854 A1* | 12/2022 | Gupta | G06F 18/24 |
| 2023/0039382 A1 | 2/2023 | Xu et al. | |
| 2023/0120865 A1* | 4/2023 | Nascimento | G06V 30/1473 |
| | | | 705/44 |

* cited by examiner

FRAUDULENT OVERLAY DETECTION IN ELECTRONIC DOCUMENTS

FIELD OF INVENTION

This disclosure relates to methods and system architectures for analysis of a file or document's structure and rendering of its contents, and more specifically, to a method of and system for analyzing a visual presentation of data to identify when the presentation may be concealing or misleading its viewer for a fraudulent purpose.

BACKGROUND

Many important financial and legal transactions are achieved via the use of documents or forms that are signed by a person whom is affected by the transaction. These documents include checks, bank wire instructions, promissory notes, contracts, instructions to brokers or agents, official government forms, and so on. After the signature is provided, the document is sent to an agent or official for the financial or legal effect of the document to be implemented. If a malicious actor is able to obtain or intercept one of these documents before or after the signature is applied and to modify it, the original intent of the document can be replaced with a fraudulent one, and the signer harmed.

Historically, if a physical paper document has been modified from its original contents, there will be visual evidence of the tampering, whether it be "whiteout" or "liquid paper," eraser marks, mismatched ink, mismatched fonts, or other inconsistencies. However, in the digital age, a PDF ("Portable Document Format"), a website, or any other presentation of information can be seamlessly altered without any visual indication that tampering has occurred. Only two methods can verify that all the elements that were intended to be present in a document are still present: a careful, line-by-line visual review by a human, or an automated review of the code or markup used to generate a view of the document.

The volume of documents being generated each day by governments, corporations, and their constituents/customers makes human review of every document completely infeasible. However, even an automated review process has vulnerabilities. Because many document formats allow for layering of visual elements, it is possible to layer new elements over existing elements without deleting the underlying existing elements. Even though the added elements fully conceal the existing elements, the original code or markup language for generating the existing elements remains. A straightforward text search might confirm that a document still contains the correct phone number, bank account number, bank routing number, or other critical information, but such a search cannot as easily confirm that such information will actually be visible when the document is ultimately rendered on a computer screen or printed out on paper.

As a result, one tactic now used by scammers is to create (or intercept and modify) a PDF for a wire transfer or other financial instruction that contains a legitimate destination for the funds, overlaid by text with an illegitimate destination. If the document is printed out, the legitimate destination will not be seen. When given only a cursory review, the change will not be noticed. Once signed and forwarded to a bank, the funds are diverted to the illegitimate destination.

Existing malware detection systems tend to be of little use in addressing scams of this sort. Most tend to focus on dynamic analysis and possible polymorphism of code: whether a document will execute malicious code when opened or interacted with. Others may identify questionable documents based on document metadata that is easily altered before transmission to a victim. Methods for systematically detecting fraudulently overlaid text in documents remain elusive.

SUMMARY OF THE INVENTION

In order to address the limitations of previous fraud detection systems in this field, new methods of identifying and responding to fraudulent overlays are disclosed. Unlike most fraudulent document detection schemes, the analysis to be performed is static, relying on qualities of a document and its visual elements, rather than reviewing a file for customer information which may be validated independently.

After detection of the overlay has been accomplished, the results of analysis are used both to improve fraudulent document identification schemes to make them more sensitive to this form of malicious attack, and to alert concerned individuals before such documents can be printed, signed, or acted upon. A machine-readable ontology of attack vectors is generated, allowing further detection and mitigation at a very large scale, far larger than human analysis or prior machine classification systems have been capable of.

A computer-implemented method of analyzing the contents of a file in a visual document format to identify a potentially-fraudulent overlay is disclosed. The method includes receiving the file, iterating over a set of visually rendered elements within the file, and calculating, for each element in the set, a bounding box. Based on identifying a pair of elements having at least partially overlapping bounding boxes, such that a visible item in an overlaid element at least partially obscures an item in an underlying element that would otherwise be visible, an attack vector ontology is updated to include information on the overlaid and underlying element. This attack vector ontology may be used in training an automatic system to identify fraudulent documents and prevent their being printed, signed, and/or further used.

Additional more specific examples of this analysis, identification, and response are detailed further below, in relation to the drawings.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any embodiment), of which:

DETAILED DESCRIPTION OF THE DRAWINGS

Figure 1:
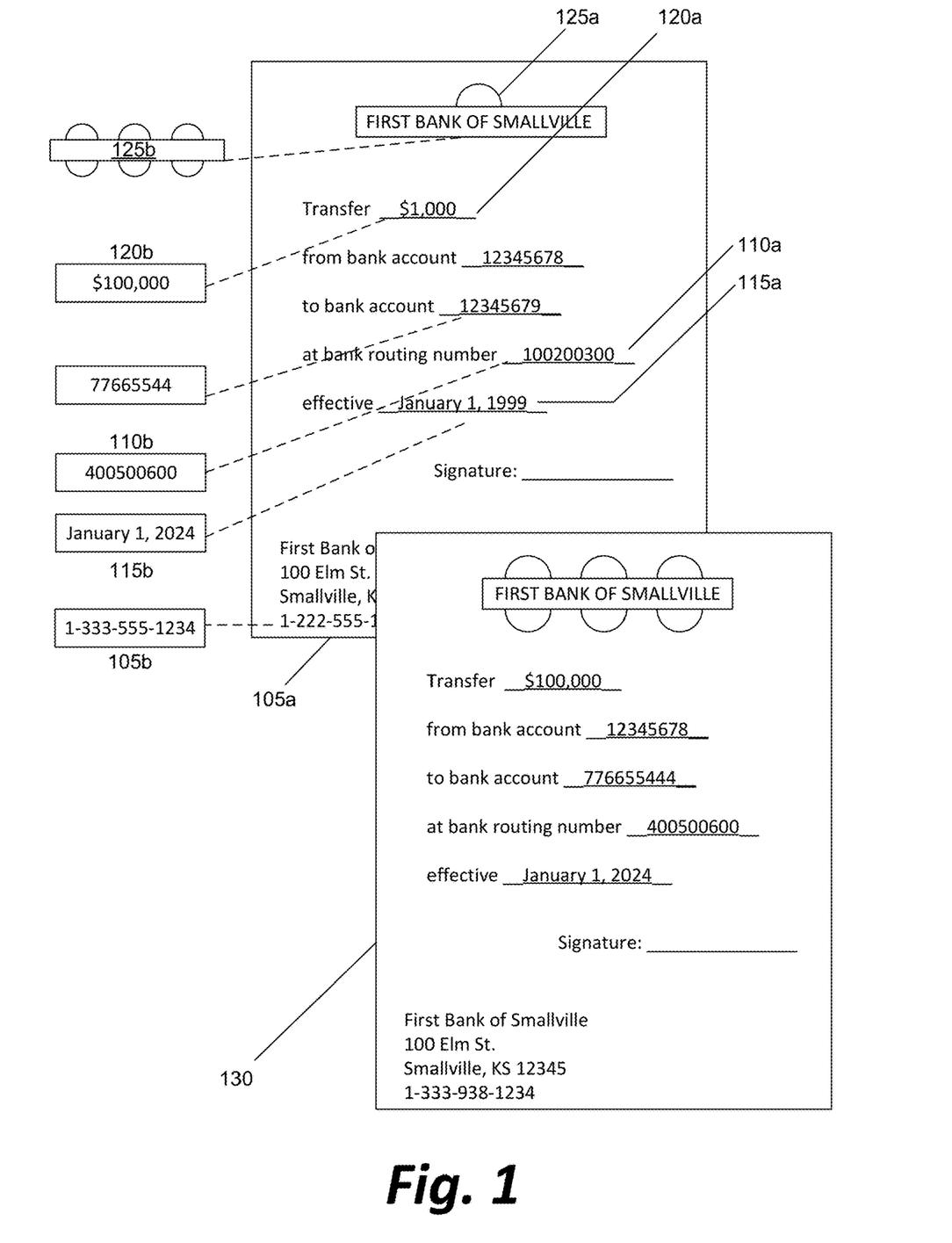
FIG. 1 depicts an example PDF that has been modified to incorporate a fraudulent overlay.

FIG. 1 depicts an example PDF that has been modified to incorporate a fraudulent overlay.

In an overly simplified example, a one-page PDF document 100 may contain a number of prefilled text fields such as a phone number 105a, bank routing number 110a, date 115a, currency amount 120a, among other fields to be filled in by the individual who will sign the document. The document may also include a logo or other image 125a in order to act as a letterhead or other indicator of source or authenticity. If an attacker is able to modify the document by adding new layers 105b, 110b, 115b, 120b, 125b that partially or completely obscure the original corresponding regions 105a, 110a, 115a, 120a, 125a, those original regions will no longer be normally visible. Unless a user is opening the document in atypical display software, the document will have a wildly different rendering 130 on a screen or when the document is printed to paper.

As depicted, this new rendering 130 results in a document that might request transfer of a different amount of money to a different account on a different date. It can provide a different phone number to divert any user requests to confirm authenticity to a fraudulent call center that is participating in the scam. As previously mentioned, the document still contains the commands for generating text boxes with the correct contents, so a computing system that naively confirms the correct account number, currency amount, etc. are present in the document will not trigger an alarm because these contents have not been changed; they have been obscured.

The following figures and their description describe a method of analyzing a document to determine whether a fraudulent overlay is obscuring the true underlying information, a system for applying this method to documents at volume, and furthermore a method for developing an ontology of fraudulent overlays. This ontology can be used to leverage confirmation of a particular example of an attack into description of a genus of attack, enabling an automated system to identify likely fraudulent overlays even faster and associate them with a particular malicious source, even when some details in each example of the attack genus differ.

Although the preferred embodiment of this disclosure has been tested extensively on PDF files and some strategies are of greatest use when considered in the context of PDF files, there are numerous graphical or markup schemas that are potentially vectors for fraud in the same way. HTML/XHTML, CSS, or other website markup languages have the ability to create elements that are layered above and conceal other data that is still present in the source file. PSD (Photoshop Document), XCF (Experimental Computing Facility), and other formats for storing projects in graphics editors permit the use of layers during editing as well, as do SVG and other vector-based graphics formats for storing an image in its final form. Microsoft Word, similar word processing document formats, Microsoft Excel, similar spreadsheet document formats, and other document editing formats that normally require the presentation of text and images inline, in a non-overlapping sequence, may nonetheless permit images or other elements to be created outside of the sequence and to overlay images or text in the sequence. For the purposes of this disclosure, the document and potentially fraudulent overlay being introduced to the document may be in any data presentation format that permits one layer of visible information to partially or completely eclipse another layer that would be fully visible but for the overlay. Anywhere the term "PDF" is used, any other documentary format may be assumed, except when reference is made to a feature unique to the PDF format.

Obtaining Documents for Processing

Figure 2:
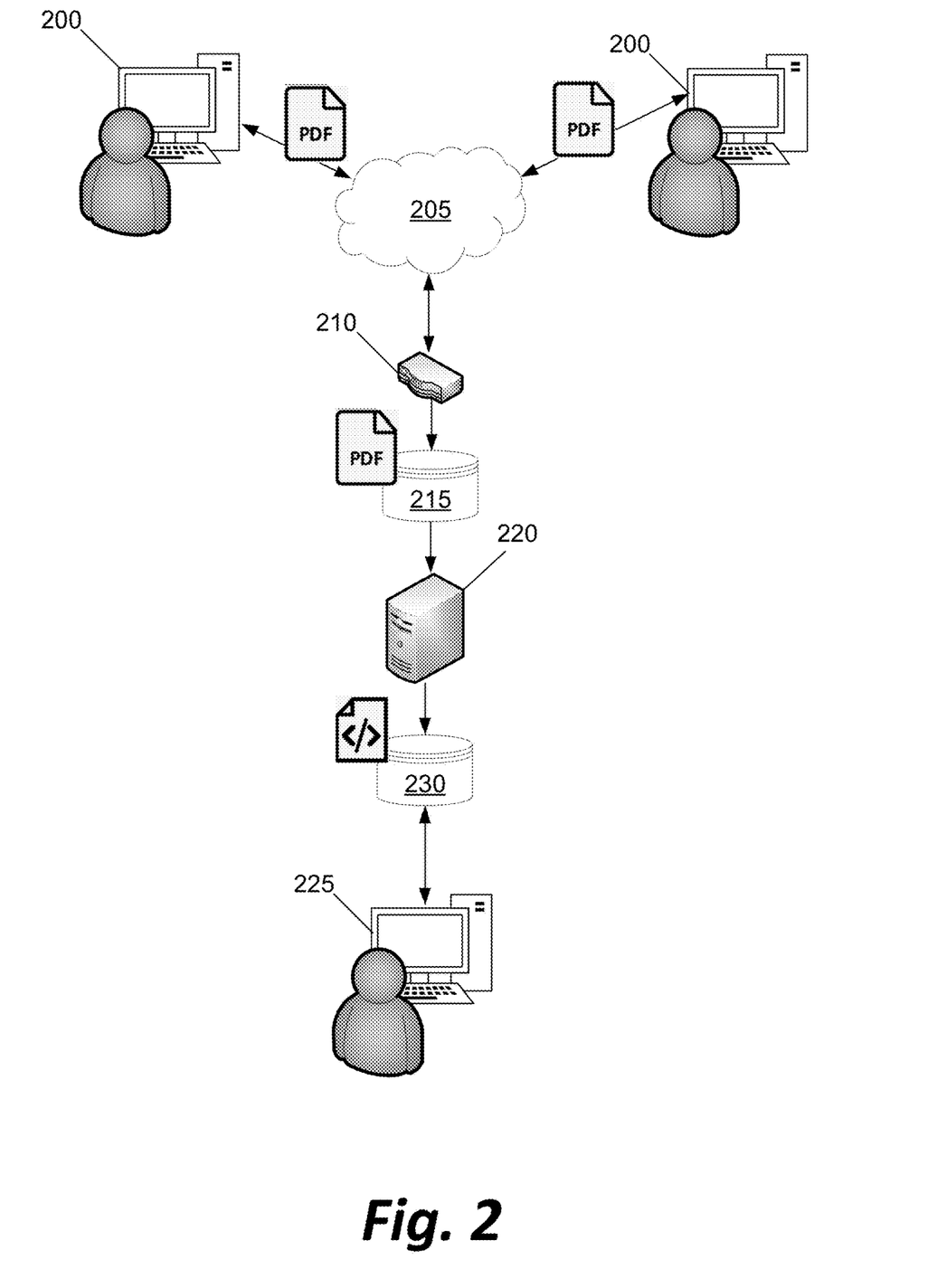
FIG. 2 depicts an example system of computing devices used to monitor transmission of documents over a network or into storage, and to analyze captured documents for evidence of fraudulent overlay.

FIG. 2 depicts an example system of computing devices used to monitor transmission of documents over a network or into storage, and to analyze captured documents for evidence of fraudulent overlay.

One or more client computing devices 200 may be used to receive and transmit files (including documents of the type depicted in FIG. 1) over a network 205. When such a transmission or reception occurs, it may be intercepted by a router, firewall, packet sniffer, network tap, or other networking device 210 that is capable of reviewing all packets sent through it and conditionally processing or copying data that meets certain criteria.

In the presently described embodiment, the router 210 forwards all PDFs that cross its path to a database or data lake 215 to be stored while awaiting processing to identify possible indicia of fraudulent modification. The router 210 may perform some sort of local file deduplication or query the database 215 before transmitting a file that has already been stored and reviewed, for the sake of efficiency.

Files may also end up in the database 215 from other sources rather than interception in transit. For example, a script running on the various client computers 200 may identify that a document has been downloaded and stored in the machine's "Downloads" folder or other local memory, and in response, forward a copy to the database 215. Files may also be provided to the database 215 from an external source, such as a repository of documents captured from a known fraudulent entity that have not yet been reviewed.

Figure 3:
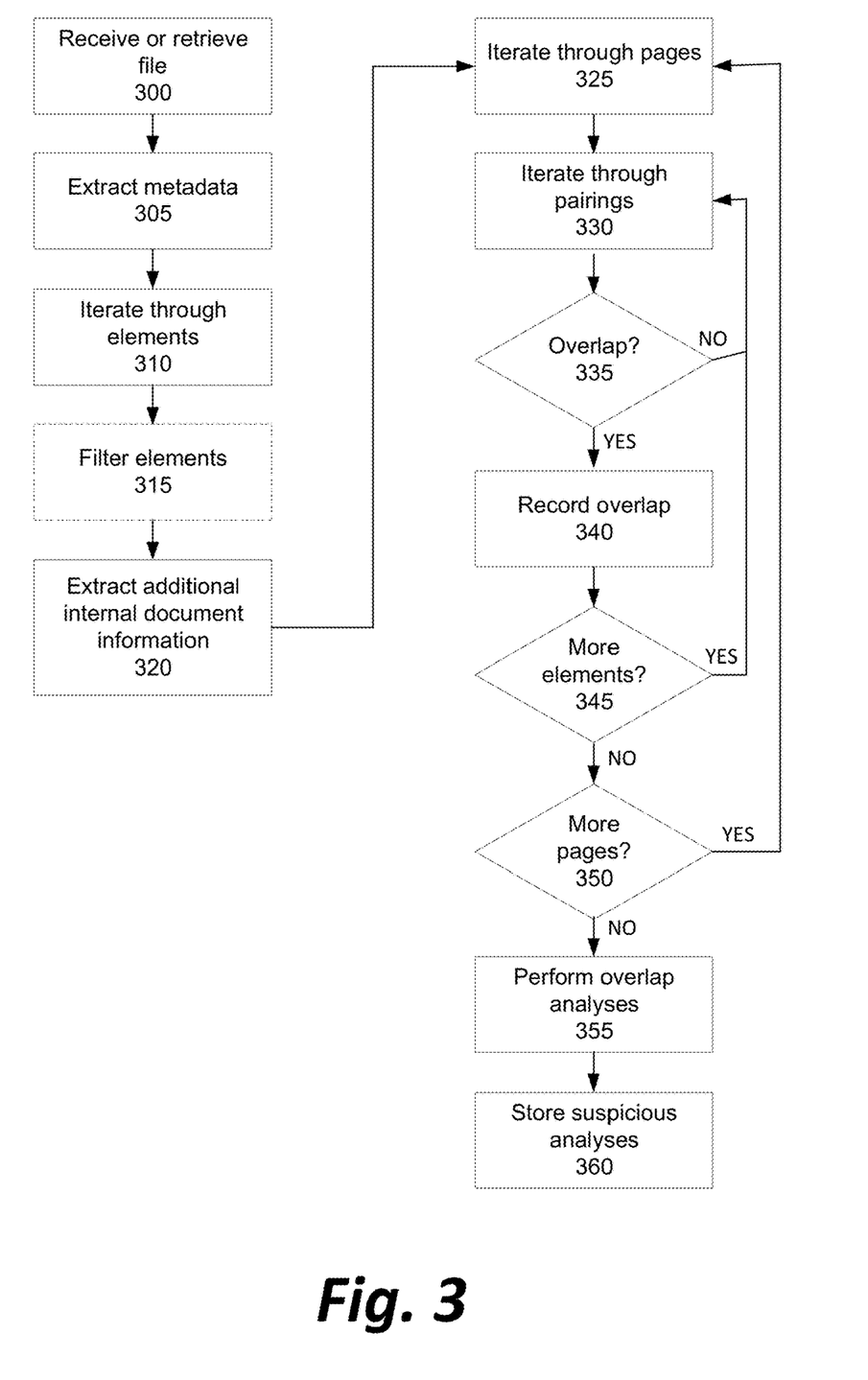
FIG. 3 depicts, in simplified flowchart form, a method of identifying a potentially-fraudulent overlay in a document.

A server computing device 220 periodically retrieves newly stored PDFs from the database 215 to perform analysis upon them, according to a method described in greater detail in FIG. 3.

In an alternative embodiment, the router 210 may transmit a PDF directly to the server computing device 220 for immediate processing, rather than the file being stored in the database 215 to await processing. In such an embodiment, the PDF might be stored in the database 215 only if the server computing device verifies that potentially fraudulent modifications are suspected, and be discarded if no modifications are detected.

In another alternative embodiment, each file may be retrieved and processed by the server computing device 220 only when a manual selection of the file and request for analysis of that file by a human user occurs, or when particular predefined triggers or criteria for the file are met. Such requests for analysis, identifying a particular file or group of files, may be received from one or more analysts' computing devices 225.

After the analysis, a separate database 230 may be used to store relevant data generated during the analysis. The relevant data may include, among other examples, elements of an attack vector ontology described further below in relation to FIG. 3, or forensic analysis images generated during analysis to aid a human analyst, as described further below in relation to FIG. 4.

The analysts' computing devices 225, in a preferred embodiment, are capable of displaying a graphical user interface that displays information including the forensic analysis images and/or information from the ontology. The graphical user interface may further be used for other administrative anti-malware tasks, such as confirming a suspicious element is fraudulent, whitelisting a particular element during future analyses, editing malware heuristics to use, and so on.

Ultimately, many variant configurations for systems may exist apart from that which is depicted in FIG. 2. For example, instead of a single data lake 215 storing both innocent and malicious files awaiting analysis, there could be one data lake for all files received, and a second one into which files are migrated once a fraudulent overlay is detected; similarly, there could be a third data lake for innocent files, such that the first data lake only contains files that have not been analyzed yet, and all files ultimately end up deleted from it and moved to either the second or third data lake based on the results of the analysis. Similarly, instead of a single database 230 for generated ontologies and forensic images, separate databases for each information type might be used.

Further, although a particular division of functions between devices is described here, other configurations are possible in which functions are divided among devices differently. For example, all of the functions of some or all of the server computing device 220, router 210, database 215, database 230, and analyst computing device 225 might conceivably be performed by a single device with multiple threads executing different software modules simultaneously. Alternatively, the server computing device 220 or the databases 215, 230 may in fact each be a cluster of computing devices sharing functionality for concurrent processing. Even though FIG. 2 and the various descriptions in this disclosure treat each of these various computing elements as if they are one computing device or cluster each, a cloud-based solution with multiple access points to similar systems that synchronize their data and are all available as backups to one another may be preferable in some embodiments to a unique set of computing devices all stored at one location.

The specific number of computing devices, and whether communication between them is network transmission between separate computing devices or accessing a local memory of a single computing device, is not so important as the functionality that each part has in the overall scheme.

Analyzing the Document

FIG. 3 depicts, in simplified flowchart form, a method of identifying a fraudulent overlay in a document.

As an initial note, many of these steps involve preprocessing or analyses that can be performed independent of each other. Even though these steps are described in a sequence, there is no limitation of the steps being performed in this sequence except where explicitly noted that a step relies on a particular result from a previous step.

First, a PDF or other file that encodes a visual document is received or retrieved for processing (Step 300).

Next, metadata is extracted from the file (Step 305). In a preferred embodiment, the extracted metadata includes at least the author, the creation timestamp, the software the file was created with, the last modified timestamp, the title, and the producer. Other fields applicable to all files in an operating system, or to document rendering formats specifically, may also be extracted.

Next, every distinct element of the file is iterated over in rendering order (Step 310), noting the type of each element ("text", "image", "shape", etc.) and its bounding box, the minimal x- and y-axis-aligned rectangle that would fully contain it. If different coordinate systems are used within a document (such as elements with coordinates specified relative to another element, rather than absolutely located, or the use of different lengths such as inches, "em"s, pixels, etc.), these coordinate systems should be standardized and normalized before recording the bounding boxes. In many rendering specifications, including PDF, the rendering order will be the same order in which the commands are presented in the file. Nevertheless, if a specification allows for a disconnect between the command order and the rendering order, such as the "z-index" parameter in CSS, elements will be sorted such that the order of iteration is the same order as the "layers" appearing in the document, from bottom layer to top.

Furthermore, an element that would normally be classified as a non-"text" type may be stored as "text" if the element appears to be intended to represent text. Such a determination could be based on OCR or other analysis determining that an image contains pixels representing rasterized text, or that one or more lines/polygons/shapes represent one or more characters (for example, two intersecting rectangles that would pass for the letter "T" without close inspection, or two concentric circles that would pass for the letter "O").

Optionally, elements may be filtered out or ignored from the full set of elements (Step 315). Criteria for such a step might include, depending on the type of document: an element's coordinates placing it fully above the top margin, below the bottom margin, or off to the sides beyond the side margins, so that it would not appear when rendered: an element being fully transparent: an element having dimensions of zero pixels by zero pixels: an element having the same color as an underlying or neighboring element so that it is visually imperceptible: or any other criterion making it irrelevant to a vision-based documentary attack. Similarly, elements may be filtered out if they have been previously whitelisted as irrelevant to any possible fraud determination, or if they appear on pages of a document that do not contain instructions, will never be parsed by a human agent or automated system, will never be acted upon, and so on.

If any other information is needed to understand how a document will be rendered, that information is extracted as well (Step 320). For example, in the PDF standard, "graphics states" are added to a data structure to set certain rendering parameters for multiple elements before those elements are declared, rather than specifying those parameters individually for each element at the time of that element's declaration. Thus, a given element's appearance (including transparency, stroke color, and other parameters) may not be knowable without the additional context of the graphics state that will be in effect at the moment in the rendering order that the element appears.

For each page of the document (Step 325), for each possible pairing of elements on that page (Step 330), an overlap calculation is performed to see whether the bounding boxes of the two elements intersect (Step 335). Because the bounding box intersection calculation is extremely efficient once all bounding boxes are expressed in the same coordinate and axis system, each pairwise comparison can be performed very quickly, even when a page of the document has a large number of elements. When there is an overlap, the fact of that overlap is recorded (Step 340). Iteration through all elements (Step 345) and through all pages (Step 350) continues until every overlap on every page has been identified.

Once all overlaps have been identified, an overlap analysis is performed on each one (Step 355). The overlap analysis will determine the answers to a number of questions concerning the overlapping elements. In a preferred embodiment, these questions may include and are not limited to:

Is the overlap a perfect overlap with all four corners of the bounding boxes matching at the pixel level, or is it a fuzzy or imperfect overlap that is off by a number of pixels? (A perfect overlap likely indicates a machine generated element to match and overlap the existing element, while an imperfect overlap likely indicates a human generated the element by hand in a graphical user interface.)

Is the overlap a partial overlap of all text, or a full overlap of all text? (A partial overlap that preserves some of the original text is more likely to be some kind of error or to have a legitimate explanation, rather than being both fraudulent and sloppy during PDF editing.)

Does the overlapping element contain text that isn't whitespace or non-printing characters? Does the underlying element contain text that isn't whitespace or non-printing characters? (Visible text overlaying formerly visible text is much more likely to represent a fraudulent replacement than text overlaying an image, or vice versa.)

If there are overlapping text boxes, do the individual printing characters in those text boxes also overlap? (This can be determined by calculating bounding boxes for each character individually and repeating the bounding box calculations at a finer level. It is far less likely to be a fraudulent overlay if printing characters have been added over the whitespace in the underlying text, or if whitespace has been added over the printing characters in the underlying text, such that all the underlying text is still visible.)

If there is an overlaid image or shape, is the image or shape substantially transparent, or fully opaque? (This can be determined by examining the alpha channels, if any, of the image, the graphic states of a PDF, whether the shape has a fill parameter set, whether the shape has stroking and non-stroking color or transparency, and so on. If the image is substantially transparent, it will permit any underlying text to be seen rather than hiding it.)

If the image is opaque, do the opaque regions of the image intersect the bounding boxes of individual printing characters in the underlying text? (As before, an overlay is less likely to be fraudulent if it only covers up whitespace in the underlying text and still permits the text to be seen.)

Is there text that shares a color with an image or filled area underneath it? (In this case, it may even be possible to supplement a fraudulent overlay by use of a fraudulent underlay. If a black rectangle is placed beneath black text, said text will be hidden even though it is in the top rendering layer. Similarly, changing text to white when it is over a white background will hide it as well—or even when there is no background, but a PDF viewer and a physical printer will both default to a white page on which text is displayed. A direct overlay of one relevant value over another will not be necessary, if the original value can be hidden via coloration and the replacement value can be included elsewhere on the page.)

Are there any images that are the full page size? (This may indicate that the document has been intercepted and scanned, and some form of OCR has been performed upon it, rather than being the original PDF electronically generated from a word processor or similar software.)

What is the semantic significance of any underlying or overlaid text? (Values that appear to represent names, addresses, phone numbers, currency, account numbers, routing numbers, credit card numbers, and so on, when replaced by a different value having the same semantic significance, are far more likely to represent an attempt at fraud than text that contains a narrative or other text less likely to be relevant to fraud. Semantic significance may be identified in part by the use of regular expressions to find matching text, by proximity to a label such as "Account Number:" or "DOB:", or by machine learning classifiers or similar techniques.)

In various embodiments, the answers to these questions may represent criteria for deciding whether to store any information on the overlay, or they may instead represent extracted features to be stored regarding every identified overlay. Regardless, when the criteria are met in the former case, or when the analysis is complete in the latter case, extracted data on the overlay is stored (Step 360), as described below, in order to provide data for large scale analysis and fraud prevention systems.

Creating a Fraudulent Overlay Taxonomy or Ontology

After a suspicious overlay is identified, data concerning the overlay is stored in an easily indexable and searchable format in the database 230 to build up an ontology of previously seen overlays.

For example, an entry in the ontology might be stored in the form of the following JSON object:

{
"evenodd": true,
"fill": true,
"graphic_state_action": {"non_stroking_alpha": 1.0, "stroking_alpha": 1.0},
"graphic_state_name": "GS0",
"ns_color": 1,
"order": 15152,
"overlay_class": "<LTRect 48.000, 741.627, 557.400, 762.977>",
"page_number": 10,
"pts": [
[48.0, 50.373],
[557.4, 50.373],
[557.4, 29.022999999999996],
[48.0, 29.022999999999996]
],
"replacement_text": ["Acct #1111111111"],
"s_color": None,
"stroke": False,
"technique": "shape_over_text_non_transparent",
"text": ["Acct #1234567890"]
}

The JSON object records a variety of information about the attack vector, including the text that was intended to be present and the text that is overlaid (if any), the coordinates, size, and nature of any polygons, images, or other elements used to accomplish the overlay, the stroking and non-stroking color and whether the stroking lines or non-stroking fill are transparent, the page of the document on which the overlay occurred, the order of the overlaid element in the total sequence of elements to be rendered, and possibly other features of the element that are specific to how it is to be rendered-including, for one example, whether the even odd algorithm is used to fill or identify regions of a polygon with intersecting segments and internal omitted regions, or the use of image masks. The object may also record metadata derived from the underlying data, such as a determined classification that the technique over the overlay is "shape over text, non transparent." Other types of technique may include "shape over full page, non transparent", "shape over some text, non transparent", "image over text, non transparent", "image over full page, non transparent", "image over some text, non transparent", and so on. The object may also record information specific to a particular document format, such as the "graphic state" being used to render this element when the PDF is rendered.

Naturally, formats other than JSON for storing the ontology data may be used, including without limitation XML, CSV, or other textual file formats, a tabular database format such as the SQL family of database systems, a NOSQL database format, or any other storage format that will facilitate searching for particular features.

An application programming interface may be provided to search for prior attacks based on matching one or more criteria—for example, matching the replaced and replacement text precisely—or based on Boolean or fuzzy match logic. For example, a regular expression might be provided to match a set of replacement texts, such as every time a phone number is replaced by another phone number, or every time one of the fifty United States is replaced by a different state, indicating that a fraudulent overlay may be attempting to redirect phone calls or mail to a different recipient. Regular expressions or partial text matching may be used to identify particular document features of high salience, such as account numbers, routing numbers, names of banking institutions, Swift codes for banking institutions, other unique identifiers for or ways of designating a particular financial institution, currency symbols in conjunction with numbers that indicate an amount of currency, names of individuals, and so on, and to identify overlays that appear to be affecting those particularly salient features.

Searching features may be provided through an API or via features of the database indexing system, allowing for searching for all ontology entries matching a particular text, a particular regex, a particular page number of a document or total number of pages in the document, what technique was used, and so on.

Figure 6:
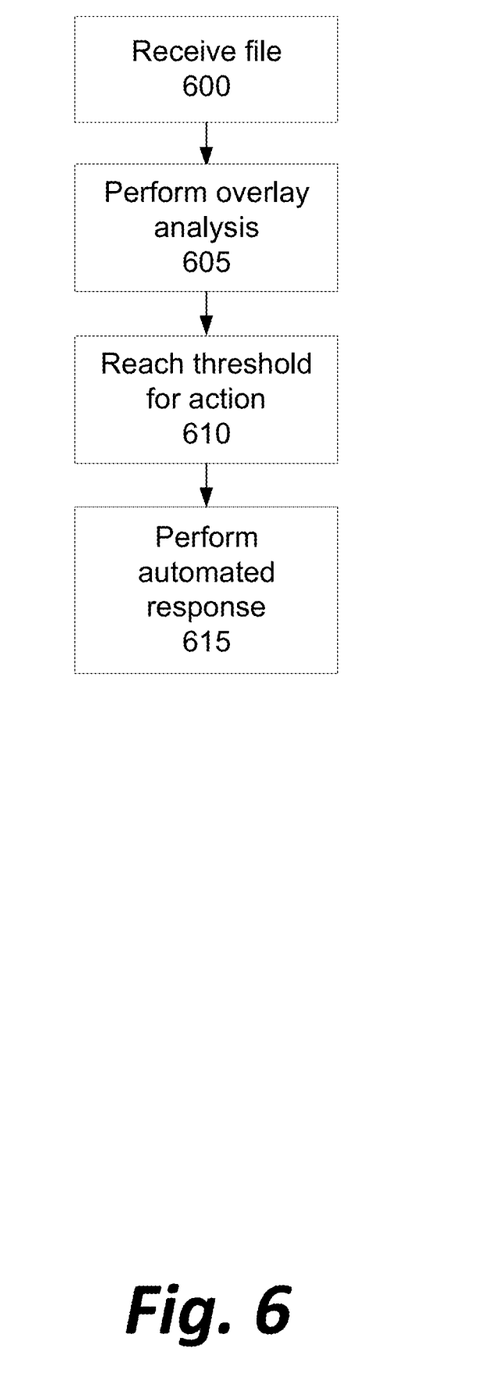
FIG. 6 depicts, in simplified flowchart form, a method of securing a computing device against possible fraudulent documents.

Entries in the ontology may be tagged as confirmed fraudulent overlays after a human has reviewed them and has confirmed that the overlay would naturally lead an unaware observer to misunderstand or pervert the intention of the original document. Once entries in the ontology have been identified as such, machine learning techniques (such as vectorizing the entries and performing vector similarity analysis) may help to identify the highest priority overlays for future human review. The level of similarity of a given new entry to a known fraudulent entry may also be used to inform automated heuristics and to block or quarantine files, preventing those files from being transferred over a network or stored on a protected device. FIG. 6, discussed below, depicts such an automated method.

Example Attack Vectors

Figure 4:
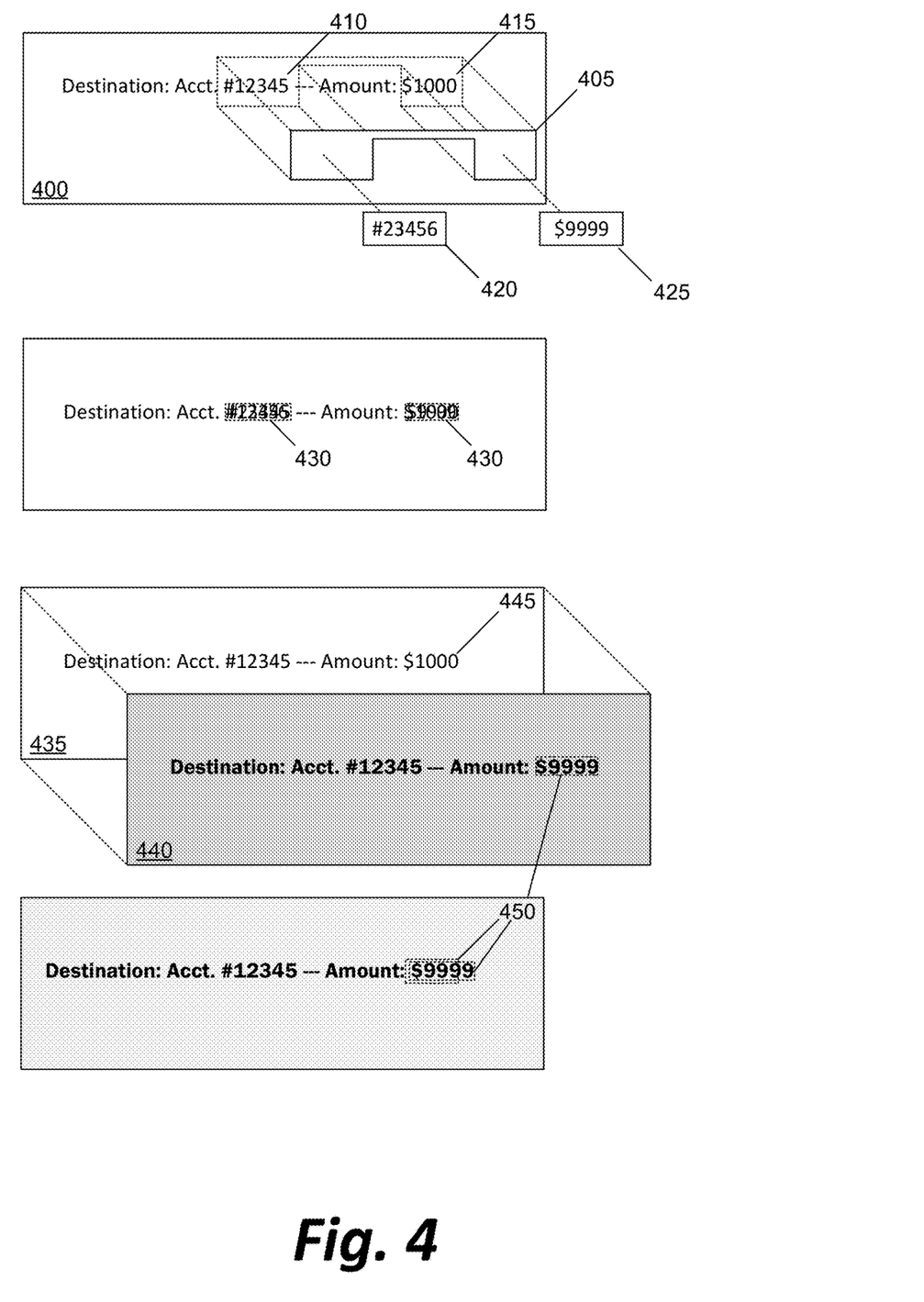
FIG. 4 depicts several potential attack vectors and identification of example bounding boxes to identify them.

FIG. 1 depicts a simplest example of an overlay attack: FIG. 4 depicts two additional example potential attack vectors and example identifications of bounding boxes to help identify them.

In a first attack 400, an opaque polygon 405 has been rendered over an underlying text elements 410, 415. Additional text elements 420, 425 are then rendered over the polygon 405, effectively replacing the text from the original elements 410, 415. However, the bounding boxes 430 will overlap, indicating that further review is necessary and ultimately identifying the deception.

In a second attack 435, an image 440 fully obscures the original document and a text element 445 within it. Although no text elements are part of the overlay, OCR may be performed to identify that text is incorporated into the image, and bounding boxes 450 of the original text and the text in the new image will overlap.

Naturally, many different variations of shapes, images, text renderings, and other techniques may be used, and the present disclosure is infinitely adaptable so long as a means of analytically determining layer orderings, bounding boxes, and the presence of text or other information is possible.

Forensic Image Analysis Assistance, and Viewing Software to Aid Human Analysts

In order to make the taxonomic data discussed above more digestible and useful to a human analyst, it is helpful to create a visual interface for reviewing documents in the context of the taxonomy.

The visual interface is enabled in part by generation of a number of forensic analysis images, including those that have been annotated or modified to emphasize visually the nature of the fraud. Such images may not only aid a human reviewer, but may also be useful for training AI-based classifiers, or for generally assisting in machine-based analysis of future, similar documents.

Figure 5:
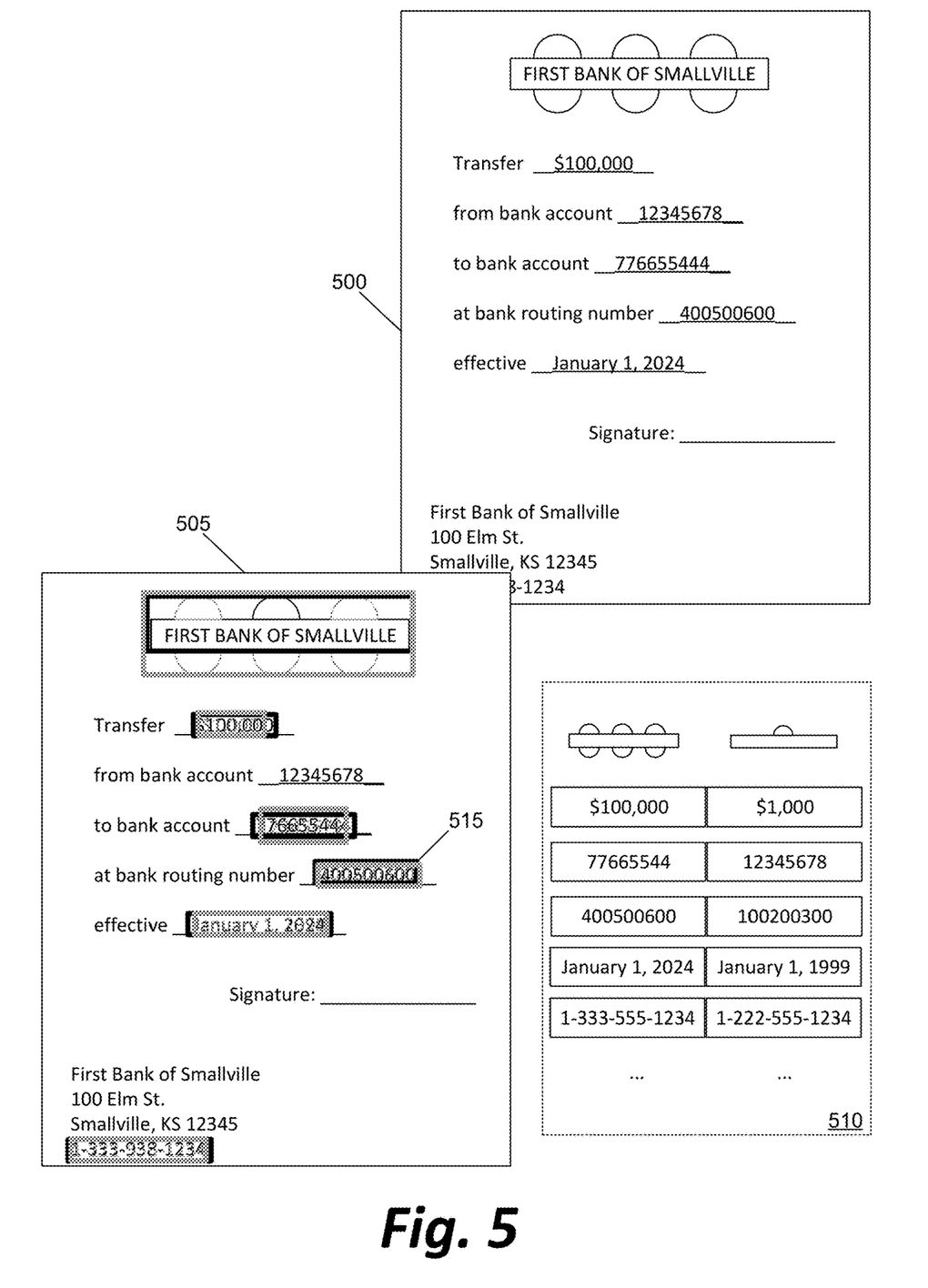
FIG. 5 depicts examples of possible forensic analysis images that could be created to aid in human-oriented or machine-oriented analysis.

FIG. 5 depicts examples of possible forensic analysis images that could be created to aid in human-oriented or machine-oriented analysis.

In a preferred embodiment, upon identifying a suspicious overlay, versions of the document are generated in which (1) the document is displayed (500) as it would be seen in a typical viewer, (2) the document is displayed with transparency and coloring effects (505) to show when an overlay has occurred, and (3) all images and text are extracted (510) for separate or side-by-side viewing.

Thus, a viewer may be able to toggle between the unmodified view 500 and modified view 505 at will to immediately see the effects of an overlay highlighted by the view 505 and how obvious the overlay is in the view 500

The modified view 505 has been supplemented with a number of colored rectangles 515. Although the colors are not visible in this patent figure (and are instead rendered in gray), in a preferred embodiment, bright primary and secondary colors such as a vivid red, blue, cyan, green, or magenta could be used to highlight rectangles that are relevant to the ontology. This could include, in some embodiments, one color such as blue for a rectangle encompassing a document element that was originally meant to be displayed, and another color such as red for a rectangle that contains a fraudulently overlaid element. In other embodiments, highlighting techniques other than color may be used to accommodate a colorblind analyst or other needs of an organization. These techniques could include simple animations to highlight relevant regions, use of high contrast white and black, use of dotted lines, hash marks or other texturing, or any other visual cue. The color coding or other highlighting feature may also be used to indicate element type, rendering order, significance of a textual value within the element, or any other information helpful to a human analyst. If multiple different kinds of data are useful, multiple separate views 505 with differing color schemes may be generated.

The modified view 505 is also different in that a transparency effect is applied to overlaid elements before generating the picture, such that it is possible to see that there are two conflicting text values or other features such as images or shapes occupying the same space.

Because the overlaps, transparency, and bright colors may make it more difficult to discern the actual text or images being highlighted, it is preferable to render all the images and text 510 from the document separately, without any modifications other than the fact of their extraction. In potential embodiments of the interface, various assisting features can be incorporated, such as mousing over an element in the text 510 to highlight the associated rectangle 515 that accomplishes the fraudulent overlay, or mousing over a rectangle 515 to highlight elements of the text 510 that record attributes of the overlay.

Because all of the of the text and images of the document can be extracted separately and re-rendered outside of a traditional static document viewer, more helpful views may be generated in real time. For example, a viewer could have both a two-dimensional and three-dimensional version of any given document, with a toggle element to switch between the two views. The two-dimensional view might be the default when rectangles are only partially overlapping, while the three-dimensional view might be the default when the rectangles are fully overlapping and a two-dimensional view is consequently much less helpful.

Using the Taxonomy/Ontology to Prevent Future Attacks

FIG. 6 depicts, in simplified flowchart form, a method of securing a computing device against possible fraudulent documents.

First, a PDF is received for which it is unclear whether a fraudulent overlay is present (Step 600).

Next, the overlay analysis is performed (Step 605), as depicted in FIG. 3 and discussed above, in order to automatically identify overlays that are possible fraudulent elements.

Based on the similarity of any particular overlaid element or set of overlaid elements to known fraudulent elements stored in the ontology, or based on the inherent suspicion from certain overlay types—for example, overlaying one bank routing number with another, regardless of whether that specific bank routing number has ever been seen before—a predetermined suspicion threshold or trigger may be reached (Step 610). As previously mentioned, it would be natural in most embodiments to train a machine-learning classifier, such as a neural network or a vector clusterer, to be trained on ontology entries that are converted to vectors, in order to quantify the similarity of one document element to another.

When that threshold or trigger is reached, an automated response is performed (Step 615) by one or more devices in the system depicted in FIG. 2.

The automated response might include, based on the needs of a given organization, one or more of: preventing the transmission of a file containing the overlay over a network; removing the file from storage on an unsecured computer: moving the file to a quarantined computer from which it cannot be accessed without permission or elevated privileges: changing file permissions so that elevated privileges will be necessary to open it: modifying the contents of the file itself to add a warning that the file appears to have been previously modified to conceal information: generating an alert to a human user via email, SMS/text, or notification in a graphical user interface, indicating that a suspicious document has been identified; modifying an email stored in an email server to remove its attachment or render the attachment un-openable: updating a publicly accessible database or registry of malware data to inform others and allow antivirus or antimalware software to target the file: or any other automated response that will be helpful for maintaining security and preventing a possibly tampered-with file from being printed out and used in a fraud.

The automated response may be further supplemented by human actions after a human analyst has been alerted to the issue. These human responses might include generating further communications for human consumption, providing confirmation that a document is fraudulent and that future similar documents should be intercepted using the ontology, or overriding the system and whitelisting a file or element in that file that ultimately proved to be harmless.

Computing Devices Generally

Although FIG. 2 depicts a preferred configuration of computing devices and software modules to accomplish the software-implemented methods described above, those methods do not inherently rely on the use of any particular specialized computing devices, as opposed to standard desktop computers and/or web servers. For the purpose of illustrating possible such computing devices, FIG. 7, below, describes various enabling devices and technologies related to the physical components and architectures described above.

Figure 7:
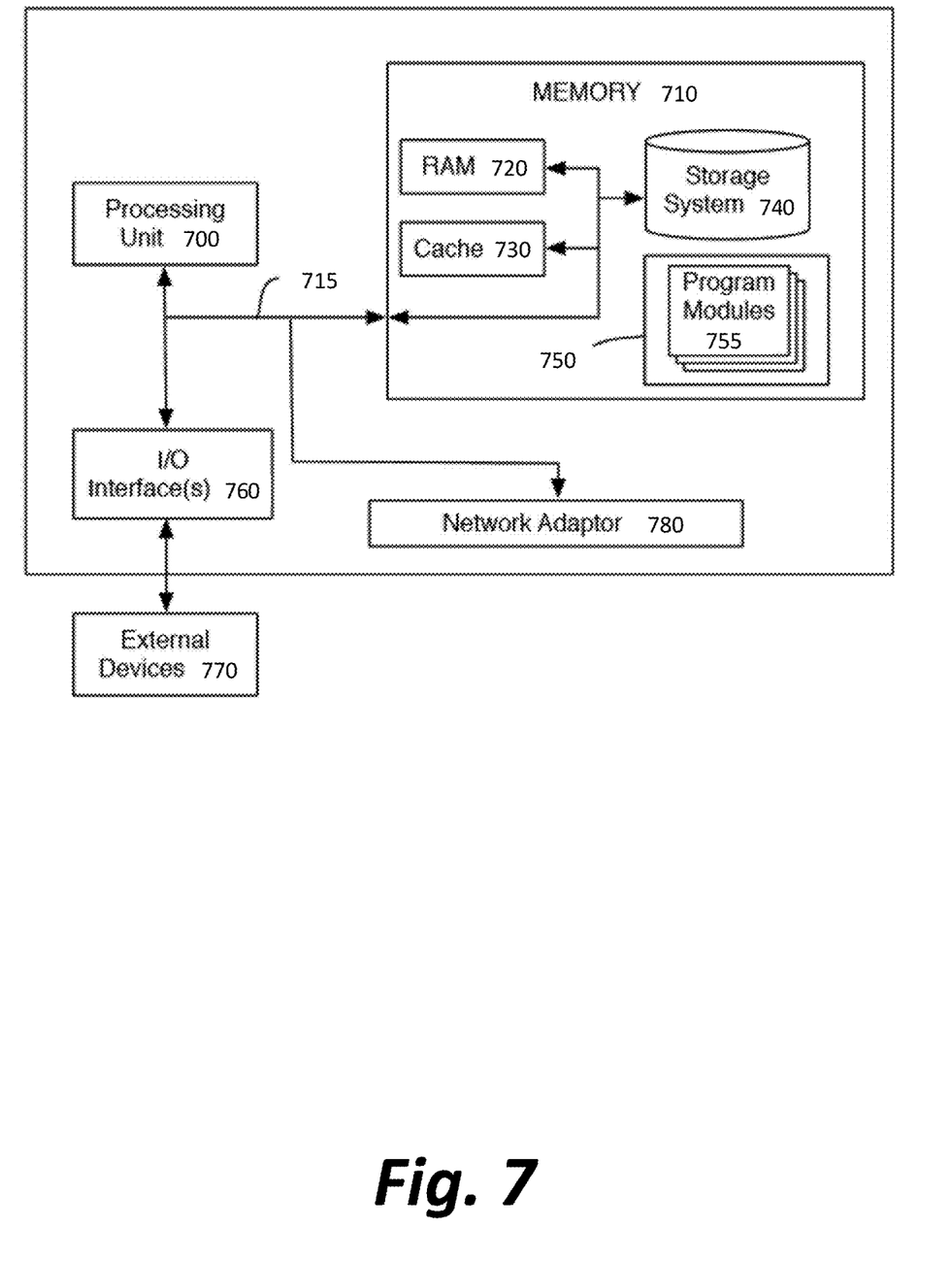
FIG. 7 is a high-level block diagram of a representative computing device that may be utilized to implement various features and processes described herein.

FIG. 7 is a high-level block diagram of a representative computing device that may be utilized to implement various features and processes described herein, for example, the functionality of the server computing device 220, router 210, database 215, database 230, and analyst computing device 225, or any other computing device described. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 7, the computing device is illustrated in the form of a special purpose computer system. The components of the computing device may include (but are not limited to) one or more processors or processing units 700, a system memory 710, and a bus 715 that couples various system components including memory 710 to processor 700.

Bus 715 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 700 may execute computer programs stored in memory 710. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 700 may be used.

The computing device typically includes a variety of computer system readable media. Such media may be any available media that is accessible by the computing device, and it includes both volatile and non-volatile media, removable and non-removable media.

System memory 710 can include computer system readable media in the form of volatile memory, such as random access memory (RAM) 720 and/or cache memory 730. The computing device may further include other removable/non-removable, volatile/non-volatile computer system storage media. By way of example only, storage system 740 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media can be provided. In such instances, each can be connected to bus 715 by one or more data media interfaces. As will be further depicted and described below, memory 710 may include at least one program product having a set (e.g., at least one) of program modules that are configured to carry out the functions of embodiments described in this disclosure.

Program/utility 750, having a set (at least one) of program modules 755, may be stored in memory 710 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 770 such as a keyboard, a pointing device, a display, etc.: one or more devices that enable a user to interact with the computing device: and/or any devices (e.g., network card, modem, etc.) that enable the computing device to communicate with one or more other computing devices. Such communication can occur via Input/Output (I/O) interface(s) 760.

In addition, as described above, the computing device can communicate with one or more networks, such as a local area network (LAN), a general wide area network (WAN) and/or a public network (e.g., the Internet) via network adaptor 780. As depicted, network adaptor 780 communicates with other components of the computing device via bus 715. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for analyzing the contents of a first file in a visual document format instructing a renderer to display text, images, or other visual elements to identify a potentially-fraudulent overlay, comprising:
   an analysis server;
   a database
   non-transitory memory storing instructions that, when executed by one or more processors of the analysis server, cause the one or more processors to:
   receive the first file;
   iterate over a set of visually rendered elements within the first file;
   calculate, for each element in the set, a bounding box;
   identify a pair of elements in the first file having at least partially overlapping bounding boxes, wherein a visible item in an overlaid element at least partially obscures an item in an underlying element that would otherwise be visible; and
   update an attack vector ontology to include information on the overlaid and underlying element.

2. The system of claim 1, wherein the instructions, when executed by one or more processors of the analysis server, further cause the one or more processors to identify a similarity between an overlaid element in a second file received after the first file and an element already described in the attack vector ontology; and to automatically act to alert a human individual or to prevent the second file from being printed, signed, and/or further used.

3. The system of claim 2, further comprising a network tap or router, wherein the first file is received from the network tap or router as the first file is transmitted over a network into which the network tap or router is incorporated, and wherein the automatically preventing the second file from being printed, signed, and/or further used comprises preventing transmission of the second file over the same network into which the network tap or router is incorporated.

4. The system of claim 1, wherein the instructions, when executed by one or more processors of the analysis server, further cause the one or more processors to generate one or more forensic images displaying elements of the first file referred to in the updated attack vector ontology.

5. The system of claim 2, wherein the updated attack vector ontology is used to train a machine learning classifier, and wherein the automatically acting to alert or to prevent occurs in response to an unfavorable classification of the second file by the machine learning classifier.

6. The system of claim 1, wherein potentially fraudulent elements are identified by a string comparison of text in both the overlaid element and the underlying element.

7. The system of claim 6, wherein potentially fraudulent elements are identified by presence of a text indicating one amount of currency in the overlaid element replacing another text indicating a different amount of currency in the underlying element.

8. The system of claim 6, wherein potentially fraudulent elements are identified by presence of a unique identifier for an entity in the overlaid element replacing another text indicating a unique identifier for an entity in the underlying element.

9. The system of claim 8, wherein the unique identifier is one of a phone number, account number, financial institution designation, or bank routing number.

10. The system of claim 1, wherein the included information when the attack vector ontology is updated includes at least two elements chosen from among: bounding box coordinate sets, text in underlay and overlay, order of element rendering, page number, element background fill color, transparency detail(s), and overlay type.

11. A computer-implemented method of analyzing the contents of a first file in a visual document format instructing a renderer to display text, images, or other visual elements to identify a potentially-fraudulent overlay, comprising:
    receiving the first file;
    iterating over a set of visually rendered elements within the first file;
    calculating, for each element in the set, a bounding box;
    identifying a pair of elements having at least partially overlapping bounding boxes, wherein a visible value in an overlaid element at least partially obscures a value in an underlying element that would otherwise be visible; and
    updating an attack vector ontology to include information on the overlaid and underlying element.

12. The method of claim 11, further comprising identifying a similarity between an overlaid element in a second file received after the first file and an element already described in the attack vector ontology; and automatically acting to alert a human individual or to prevent the second file from being printed, signed, and/or further used.

13. The method of claim 12, wherein the first file is received from a network tap or router as the first file is transmitted over a network into which the network tap or router is incorporated, and wherein the automatically preventing the second file from being printed, signed, and/or further used comprises preventing transmission of the second file over the same network into which the network tap or router is incorporated.

14. The method of claim 11, further comprising generating one or more forensic images displaying elements of the first file referred to in the updated attack vector ontology.

15. The method of claim 12, wherein the updated attack vector ontology is used to train a machine learning classifier, and wherein the automatically acting to alert or to prevent occurs in response to an unfavorable classification of the second file by the machine learning classifier.

16. The method of claim 11, wherein potentially fraudulent elements are identified by string comparison of text in both the overlaid element and the underlying element.

17. The method of claim 16, wherein potentially fraudulent elements are identified by presence of a text indicating one amount of currency in the overlaid element replacing another text indicating a different amount of currency in the underlying element.

18. The method of claim 16, wherein potentially fraudulent elements are identified by presence of a unique identifier for an entity in the overlaid element replacing another text indicating a unique identifier for an entity in the underlying element.

19. The method of claim 18, wherein the unique identifier is one of a phone number, account number, financial institution designation, or bank routing number.

20. The method of claim 11, wherein the included information when the attack vector ontology is updated includes at least two elements chosen from among: bounding box coordinate sets, text in underlay and overlay, order of element rendering, page number, element background fill color, transparency detail(s), and overlay type.

* * * * *